United States Patent [19]

Szantay et al.

[11] 3,910,953

[45] Oct. 7, 1975

[54] PROCESS FOR THE PREPARATION OF TRYPTAMINE OR ITS DERIVATIVES

[75] Inventors: Csaba Szántay; Lajos Szabó; György Kalaus, all of Budapest, Hungary

[73] Assignee: Richter Gedeon Vegyészeti Gyár RT., Budapest, Hungary

[22] Filed: Aug. 16, 1973

[21] Appl. No.: 388,980

[52] U.S. Cl. ............................................. 260/326.15
[51] Int. Cl.² ......................................... C07D 209/14
[58] Field of Search ................................ 260/326.15

[56] References Cited
UNITED STATES PATENTS
3,531,573   9/1970   Anthony ........................ 260/326.15
3,591,603   7/1971   Papanastassion .............. 260/326.15

*Primary Examiner*—Elbert L. Roberts
*Attorney, Agent, or Firm*—Karl F. Ross; Herbert Dubno

[57] ABSTRACT

The invention provides a simple and economic process for the preparation of tryptamine or its derivatives, starting from easily available, non-expensive substances.

15 Claims, No Drawings

PROCESS FOR THE PREPARATION OF TRYPTAMINE OR ITS DERIVATIVES

Tryptamine or its derivatives of the general formula (I),

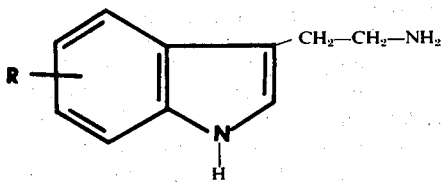

wherein R represents an alkoxy group of 1 to 4 carbon atoms, or the salts of these compounds are prepared according to the invention as follows: a compound of the general formula (II),

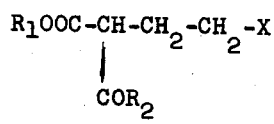

wherein
R$_1$ represents a lower alkyl or aralkyl group,
R$_2$ represents a lower alkyl or alkoxy group, and
X represents a halogen atom or an acyloxy group, is partially hydrolysed, and reacted with diazotized aniline or with a diazotized aniline derivative of the general formuls (III),

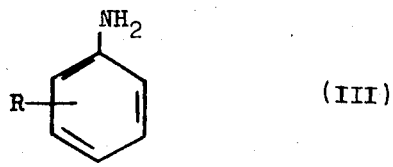

wherein R has the same meanings as defined above, if desired, the above two steps are interchanged, the thus-obtained phenylhydrazone derivative of the general formula (IV),

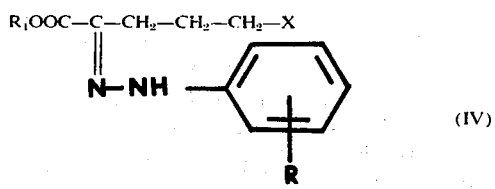

wherein R, R$_1$ and X each have the same meanings as defined above, is heated at 40° to 180°C optionally in a solvent medium, the thus-obtained tryptamine-2-carboxylate of the general formula (V),

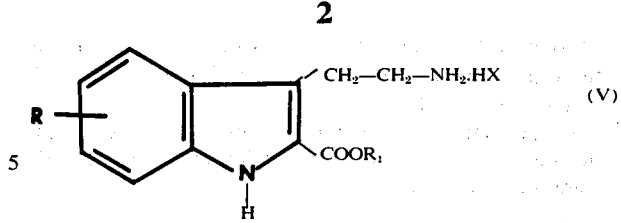

wherein R, R$_1$ and X each have the same meanings as defined above, is hydrolyzed in an alkaline medium and decarboxylated in an acidic medium, or is hydrolyzed and decarboxylated in a single step in an acidic medium, and, if desired, the obtained salt is converted into the free base.

The intermediates of the general formulae (IV) and (V) are new compounds.

This invention relates to a process for the preparation of tryptamine or its derivatives of the general formula (I),

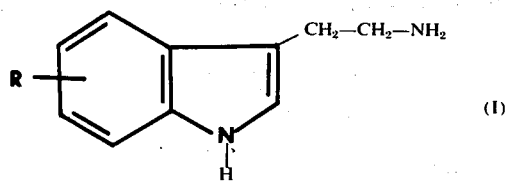

Wherein R represents an alkoxy group of 1 to 4 carbon atoms, or the salts of these compounds. This invention relates further to the novel intermediates of the above synthesis, as well as to processes for the preparation thereof.

Tryptamine and its alkoxy-substituted derivatives of the general formula (I) are the key intermediates of the synthesis of several compounds of particular medical value, such as vincamine, reserpine, etc.

Several processes have been described so far for the synthesis of tryptamine, all these known processes are, however, difficult and expensive. Thus, for example, 3-cyanomethyl-indole, which can be prepared from indole by a multistep synthesis, can be reduced into tryptamine by contacting it with reducing agents, e.g. with lithium aluminum hydride, Raney-nickel, hydrazine, etc. (Nógrádi, T.: Monatshefte 88, 768 (1957); Alimad, A., Echnurme, J. and Spenser, J. D.: Can. J. Chem. 38, 3523 (1960); Stark, G. and Richard, K.: J. Am. Chem. Soc. 79, 495 (1957); Thosing, J. and Schülde, F.: Chem. Ber. 85, 324 (1952); Terent, A. P., Presbrasenskarfa, M. N. and Ban-Lun-Che: Khim. Nauk. i Prom. 4, 281 (1959), C.A. 53, 21879 d).

According to another process indole magnesium bromide is reacted with ethyleneimine to form tryptamine (buccurt,R. and Vignan, M.: Bull. Soc. Chim. France 1961, 1190). Tryptamine can also be prepared by the decarboxylation of tryptophane (Georges Chatalus: Bull. Soc. Chim. France 1964, 2523; 1965, 929).

This invention provides a simple and economic process for the preparation of tryptamine or its derivatives, starting from easily available, non-expensive substances.

This invention is based on the discovery that when a reactive derivative of a propyl malonicester or of a propyl acetoacetic ester is reacted with diazotated aniline or with a derivative thereof, and the thus-obtained new 2-oxo-valeric ester phenynhydrazone derivative is kept at elevated temperatures, a new tryptamine-2-carboxylic acid derivative is obtained, which, in turn, is saponified and decarboxylated to yield styptamine or the tryptamine derivative corresponding to the starting aniline compound.

Accordingly, this invention relates to a process for the preparation of tryptamine or its derivatives of the general formula (I)

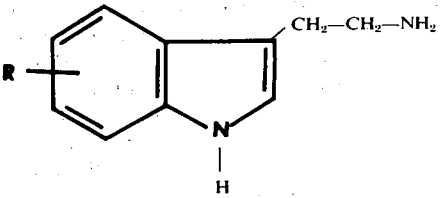

wherein R represents an alkoxy group of 1 to 4 carbon atoms, or the salts of these compounds, in which a compound of the general formula (II),

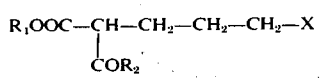

wherein
$R_1$ represents a lower alkyl or aralkyl group,
$R_2$ represents a lower alkyl or alkoxy group, and
X represents a halogen atom or an acyloxy group, is partially hydrolyzed, and reacted with diazotized aniline or with a diazotized aniline derivative of the general formula (III),

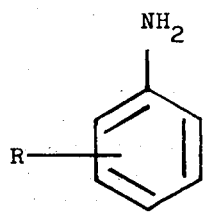

wherein R represents an alkoxy group of 1 to 4 carbon atoms, if desired, the above two steps are interchanged, the thus-obtained new phenylhydrazone derivative of the general formula (IV),

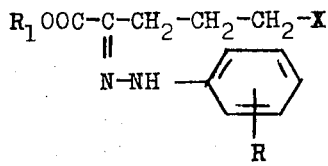

wherein R, $R_1$ and X each have the same meanings as defined above, is heated at 40° to 180°C optionally in a solvent medium, the thus-obtained new tryptamine-2-carboxylate of the general formula (V),

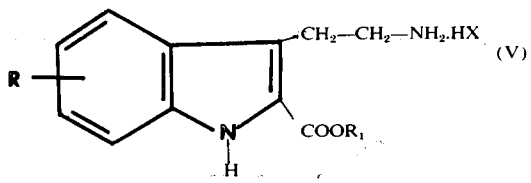

wherein R, $R_1$ and X each have the same meanings as defined above, is hydrolysed in an alkaline medium and decarboxylated in an acidic medium, or is hydrolysed and decarboxylated in a single step in an acidic medium, and, if desired, the resulting salt is converted into the free base.

According to the invention one proceeds as follows: the compound of the general formula (II) is partially hydrolysed in a homogeneous phase, preferably in ethanol with an alkali, preferably with ethanolic potassium hydroxide solution, thereafter the obtained compound is coupled directly, without isolation, with diazotated aniline or with a diazotated aniline derivative of the general formula (III). The obtained red, oily product is separated from the aqueous phase, extracted with dichloromethane, the extract is washed and dried, and the solvent is removed by evaporation. This way a cis-trans isomeric mixture of the new 2-oxo-5-halo-valeric ester phenylhydrazone derivative of the general formula (IV) is obtained. The same compound can also be prepared by coupling the ester compound of the general formula (II) in the first step with the diazotated reagent, and subjecting the obtained compound to partial hydrolysis. The new compound of the general formula (IV) is kept at an elevated temperature optionally in a solvent medium, preferably in butanol, to yield a new tryptamine-2-carboxylate of the general formula (V), which latter compound is converted into tryptamine or into a tryptamine derivative of the general formula (I) by boiling it in an aqueous-acidic medium.

According to another variant of the process of the invention the new tryptamine-2-carboxylate of the general formula (V) is first hydrolysed in the presence of a base preferably of a sodium hydroxide solution, and the obtained known tryptamine-2-carboxylic acid or its derivative is decarboxylated in a known way, by boiling it in an acidic medium (Abramovitch, R. A., Saphiro, D.: J. Chem. Soc./London/ 1956, 4589).

A great number of the starting compounds of the general formula (II) is known from the literature (Fischer, S. Bergmann, M.: Ann. 398, 120 /1913/), while the still new compounds can be prepared by processes well known in the art. Thus, for example, the chloropropyl-acetoacetic ester can be prepared by reacting ethyl acetoacetate with chloro-bromo-propane. All the aniline derivatives of the general formula (III) are known substances.

The invention is elucidated in detail by the aid of the following non-limiting Examples.

EXAMPLE 1

6.4 g. (0.11 moles) of potassium hydroxide are dissolved in 70 ml. of dry ethanol, and the solution is added dropwise, within one hour to the solution of 23.7 g. (0.1 moles) of chloropropyl-malonic acid diethyl ester in 70 ml. of dry ethanol. The addition is carried out at room temperature under constant stirring and exclusion of moisture. When the addition is complete the mixture is stirred for additional two hours, thereafter it is cooled to −5°C, and a diazotized solution of aniline is added. Diazotization is carried out by dissolving 9.3 g. (0.1 moles) of freshly distilled aniline in a mixture of 27 ml. of concentrated hydrochloric acid, and 100 ml. of water, cooling the solution to 0° to 3°C, and treating the mixture dropwise with a solution of 7.0 g. (0.11 moles) of sodium nitrite in 15 ml. of water.) The pH of the obtained solution is adjusted to 6 by the addition of a 10% sodium hydroxide solution, taking care, that the temperature of the mixture should not rise above 0°C. Thereafter the pH of the mixture is adjusted to 7.4 to 7.5 by adding further amounts of 10% sodium hydroxide solution to the mixture. The mixture is left to stand in nitrogen atmosphere for 1 hour at −2 to 0°C, acidified to pH 6 with acetic acid, and left to stand in nitrogen atmosphere at room temperature overnight. Next day the mixture is diluted with water, whereupon the obtained ethyl-2-oxo-5-chloro-valerate-phenylhydrazone separates in the form of a dark oil. The phases are separated from each other, and the oily phase is extracted with dichloromethane. The dichloromethane solution is washed with 2n sodium hydroxide solution, thereafter three times with water, dried over magnesium sulphate, and evaporated to dryness in vacuo. 24 g. of ethyl-2-oxo-5-chlorovalerate-phenylhydrazone are obtained in the form of a cis-trans isomeric mixture. The isomers are separated from each other by preparative layer chromatography (PF$_{254+366}$, 14:2 benzene-methanol mixture), and the isomers are characterized by infra-red spectroscopy.

IR spectrum of the isomer of higher R$_f$ value (R$_f$ = 0.85): 3250 (NH), 1738 (COOC$_2$H$_5$), 1680 (C=N), 1605 cm$^{-1}$ (aromatic).

IR spectrum of the isomer of lower R$_f$ value (R$_f$ = 0.78): 3300 (NH); 1735 (COOC$_2$H$_5$), 1700 (C=N), 1608 cm$^{-1}$ (aromatic).

The IR spectra if the substances were taken in KBr pellets.

The above product is dissolved in 160 ml. of n-butanol containing 4 drops of water, and the mixture is refluxed for 24 hours under nitrogen atmosphere. The reaction mixture is cooled to 0°C, and the separated 9.6 g. of ethyl-tryptamine-2-carboxylate hydrochloride is isolated by filtration, and washed with a few amount of n-butanol. Upon evaporating the butanol solution to 50% of its original volume, an additional 0.4 g. of the product are obtained. Total yield: 10.0 g. (37 %). The crude product melts at 238°C, while the melting point raises to 243°–245°C after recrystallization from ethanol.

IR (KBr): 3250 (NH); 1710, 1690 (COOEt); 1540 (strong), 1260 cm$^{-1}$ (strong).

NMR (CDCl$_3$ t, CD$_3$OD): δ = 7.85–7.05 (4H, aromatic protons), 4.45 (2H, q, J=7.2, COOCH$_2$CH$_3$), 3.7–3.2 (4H, m, —CH$_2$CH$_2$—), 1.45 (3H, t, J=7.2, COOCH$_2$CH$_3$).

10.00 g. (0.037 moles) of ethyl-tryptamine-2-carboxylic acid hydrochloride is dissolved in 100 ml. of ethanol, and 100 ml. of 4n sodium hydroxide solution are added. The mixture is boiled for 2 hours, thereafter cooled to 0°C and acidified with glacial acetic acid. The separated tryptamine-2-carboxylic acid is filtered off and washed with water. 7.6 g. (99 %) of the product are obtained; m.p.: 244°C (recrystallized from a mixture of water and ethanol).

5.00 g. (0.024 moles) of tryptamine-2-carboxylic acid are dissolved in 100 ml. of 15% sulphuric acid, and the solution is boiled for 4 hours. Thereafter the pH of the solution is adjusted to 9 by adding concentrated sodium hydroxide solution under ice cooling, and the separated 2.5 g. of crystalline tryptamine base are filtered off and washed with water. The mother liquor is extracted with chloroform, and the chloroform solution is evaporated to yield further 0.30 g. of crystalline tryptamine. Total yield: 2.8 g. (72 %) M.p.: 118°–120°C.

When acidifying the mother liquor with acetic acid, 0.50 g. of tryptamine-2-carboxylic acid can be isolated.

EXAMPLE 2

1.00 g. (3.7 moles) of ethyl-tryptamine-2-carboxylate hydrochloride, prepared as described in Example 1, is dissolved in 20 ml. of 15% sulphuric acid, and the solution is boiled for 6 hours. Thereafter the pH of the solution is adjusted to 9 with concentrated sodium hydroxide solution under cooling, and the obtained mixture is extracted with chloroform. The chloroform solution is dried and evaporated, and the obtained 0.27 g. of oily residue is crystallized from benzene. The separated crystalline tryptamine is filtered off and washed with water. Yield: 0.10 g. (33 %); m.p.: 118°–120°C.

EXAMPLE 3

3.2 g. of potassium hydroxide are dissolved in 35 ml. of dry ethanol, and the solution is added dropwise, within 1 hour to the solution of 11.9 g. (0.05 moles) of chloropropyl-malonic acid-diethyl ester in 35 ml. of dry ethanol at room temperature. The mixture is stirred for additional 2 hours, thereafter cooled to −5°C, and a diazotated solution of p-anisidine is added to the stirred mixture. Diazatization is carried out by dissolving 6.15 g (0.05 moles) of freshly distilled p-anisidine in a mixture of 19.5 ml. of concentrated hydrochloric acid and 50 ml. of water, cooling the solution to 0° to 3°C, and treating the mixture dropwise with a solution of 3.5 g. (0.055 moles of sodium nitrite in 8.5 ml. of water). The pH of the obtained solution is adjusted to 6 with 10 % aqueous sodium hydroxide solution (about 38 ml. are required), taking care, that the temperature of the mixture should not rise above 0°C. Thereafter the pH of the mixture is adjusted to 7.4 to 7.5 with a further amount of 10% aqueous sodium hydroxide solution (about 7.5 ml. of the solution are required). The mixture is left to stand under nitrogen atmosphere for 1 hour at −2 to 0°C. acidified to pH 6 with acetic acid, and left to stand under nitrogen atmosphere at room temperature overnight. Next day the mixture is diluted with water, whereupon the obtained ethyl-2-oxo-5-chloro-valerate-4'-methoxyphenylhydrazone separates in the form of a dark oil. The phases are separated from each other, and the oily phase is extracted with dichloromethane. The dichloromethane solution is washed with 2n sodium hydroxide solution, thereafter three times with water, dried over magnesium sulphate, and evaporated to dryness in vacuo. 9.8 g. of ethyl-2-oxo-5-chloro-valerate-4'-methoxyphenylhydrazone are obtained in the form of a cistrans isomeric mixture. The isomers are separated from each other by preparative layer chromatography as described in Example 1, and their structures are characterized by NMR spectroscopy.

NMR spectrum of the isomer of higher $R_f$ value (CDCl$_3$): δ = 7.25–6.98 (4H, aromatic protons), 4.27 (2H, q, J=7.0 Cps, COOCH$_2$CH$_3$), 3.78 (3H, s, OCH$_3$), 1.36 (3H, t, J=7.0 Cps, COOCH$_2$CH$_3$).

NMR spectrum of the isomer of lower $R_f$ value (CDCl$_3$): δ = 7.4–6.82 (4H, aromatic protons), 4.33 (2H, q, J=7.0 Cps, COOCH$_2$CH$_3$), 3.80 (3H, s, OCH$_3$), 1.36 (3H, t, J=7.0 Cps, COOCH$_2$CH$_3$).

The above product is dissolved in 80 ml. of n-butanol, and the solution is refluxed for 24 hours under nitrogen atmosphere. The solution is cooled, the separated ethyl-5-methoxy-tryptamine-2-carboxylate hydrochloride is filtered off, washed with a few amount of n-butanol and dried. Yield: 2.5 g. (17 %); m.p.: 226°C (after recrystallization from ethanol).

IR (KBr): 3450, 3350, 3200 (NH), 1695 cm$^{-1}$ (COOC$_2$H$_5$).

Analysis for C$_{14}$H$_{19}$N$_2$O$_3$Cl (298.81): Calculated: C, 56.40 %; H, 6.42 %; N, 9.40 %;
Found: C, 56.20 %; H, 6.43 %; N, 9.52 %.

1.00 g. (3.35 mmoles) of ethyl-5-methoxy-tryptamine-2-carboxylate hydrochloride is dissolved in a mixture of 10 ml. of ethanol and 10 ml. of 4n sodium hydroxide, and the mixture is boiled for 2 hours. The solution is cooled to 0°C and acidified with glacial acetic acid. The separated 5-methoxy-tryptamine-2-carboxylic acid is washed with water. Yield: 0.77 g. (99 %); m.p.: 247°–248°C.

The product is decarboxylated in the usual way to form 5-methoxy-tryptamine with a yield of 75 %; m.p.: 120°–121°C.

EXAMPLE 4

4.6 g. (0.05 moles) of aniline are dissolved in 42.5 ml. of 4n hydrochloric acid, and the solution is diazotated at 0° to 3°C with a solution of 3.5 g. (0.005 moles) of sodium nitrite in 8.5 ml. of water. In the same time 10.3 g. (0.05 moles) of chloropropyl-acetoacetate are dissolved in 38 ml. of ethanol, the solution is cooled to −15°C, and 38.5 ml. of a cold 20 % sodium hydroxide solution are added. The diazotated aniline solution is added dropwise to this solution at −50° to −10°C, under stirring. The pH of the obtained solution amounts to 9. The reaction mixture is left to stand at the same temperature for 35 minutes, whereupon the cis-trans isomeric mixture of the obtained ethyl-2-oxo-5-chlorovalerate-phenylhydrazone separates in the form of a dark oil. The two phases are separated from each other, and the oily phase is extracted with dichloromethane. The dichloromethane solution is washed with 2n sodium hydroxide solution, thereafter three times with water, dried over magnesium sulphate, and evaporated to dryness in vacuo.

14.0 g. of the obtained product are dissolved in 80 ml. of n-butanol, and the solution is refluxed for 24 hours under nitrogen atmosphere. The reaction mixture is cooled to 0°C, the separated ethyl-tryptamine-2-carboxylate hydrochloride is filtered off, washed with a few amount of n-butanol and then with ethanol, and dried. Yield: 5.0 g. (37.0 %); m.p.: 235°C.

The obtained ethyl-tryptamine-2-carboxylate hydrochloride is then converted into tryptamine as described in Example 2.

What is claimed is:

1. A cis-trans isomeric mixture of ethyl-2-oxo-5-chlorovalerate-phenylhydrazone.

2. A cis-trans isomeric mixture of ethyl-2-oxo-5-chlorovalerate-4'-methoxyphenylhydrazone.

3. Ethyl-tryptamine-2-carboxylate or its salts.

4. Ethyl-5-methoxy-tryptamine-2-carboxylate or its salts.

5. A process for the preparation of tryptamine or its derivatives of the formula (I),

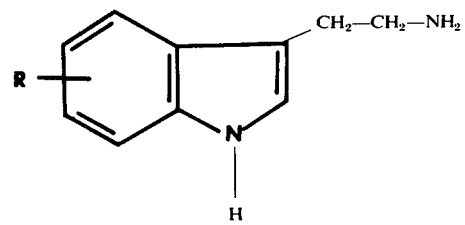

wherein R is alkoxy of 1 to 4 carbon atoms, or a salt thereof, in which a compound of the formula (II),

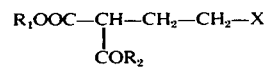

wherein
R$_1$ is lower alkyl or aralkyl,
R$_2$ is lower alkyl or alkoxy, and
X is a halogen atom or acyloxy, is partially hydrolyzed at room temperature, and reacted at −5°C to 0°C with diazotized aniline or with a diazotized aniline derivative of the formula (III),

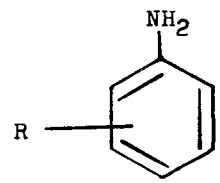

to form a phenylhydrazone derivative of the formula (IV)

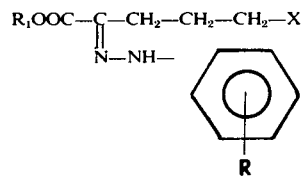

heating the derivative of formula IV at 40° to 180°C in a solvent medium, to produce a tryptamine-2-carboxylate of the formula (V),

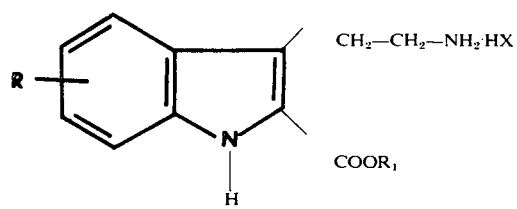

the carboxylate being hydrolyzed in an alkaline medium and decarboxylated in an acidic medium, or is hydrolyzed and decarboxylated in a single step in an acidic medium at the boiling point of the carboxylate.

6. The process defined in claim 5 wherein the obtained salt is converted into the free base.

7. The process as defined in claim 5, in which the partial hydrolysis of the compound of the formula (II) is carried out in ethanol with ethanolic potassium hydroxide solution.

8. The process as defined in claim 5 in which the reaction with diazotized aniline or with a diazotized aniline derivative of the formula (III) is carried out at a temperature below 0°C.

9. The process as defined in claim 5 in which the compound of the formula (IV) is heated in butanol at the boiling point of the mixture.

10. The process defined in claim 5 in which the hydrolysis and decarboxylation of the new compound of the formula (V) is carried out in aqueous acidic medium containing 10 to 20% sulphuric acid at the boiling point of the mixture.

11. The process as defined in claim 5 in which the compound of the formula (V) is hydrolized in a solvent medium, preferably in ethanol with an aqueous sodium hydroxide solution, at the boiling point of the mixture.

12. A compound of the formula $$R_1OOC-C(=N-NH-C_6H_4-R)-CH_2-CH_2-CH_2-X$$

wherein
R is alkoxy of 1 to 4 carbon atoms,
$R_1$ is lower alkyl or aralkyl, and
X is halogen or acyloxy.

13. A process for the preparation of a compound of the formula (IV), $$R_1OOC-C(=N-NH-C_6H_4-R)-CH_2-CH_2-CH_2-X$$

wherein
R is alkoxy of 1 to 4 carbon atoms,
$R_1$ is lower alkyl or aralkyl, and
X is halogen or acyloxy, in which a compound of the formula (II), $$R_1OOC-CH(COR_2)-CH_2-CH_2-CH_2-X \quad (II)$$

wherein $R_2$ is lower alkyl or alkoxy, is partially hydrolyzed, and reacted with diazotized aniline or with a diazotized aniline derivative of the formula (III), $$H_2N-C_6H_4-R \quad (III)$$

or a compound of the formula (II) is first reacted with diazotized aniline or with a diazotized aniline derivative of the general formula (III), and the obtained product is partially hydrolyzed.

14. A compound of the formula (V):

[indole structure with R, CH$_2$-CH$_2$-NH$_2$·HX at 3-position, COOR$_1$ at 2-position]

wherein
R is alkoxy of 1 to 4 carbon atoms,
$R_1$ is lower alkyl or aralkyl, and
X is halogen or acyloxy.

15. A process for the preparation of a compound of the formula (V):

[indole structure with R, CH$_2$-CH$_2$-NH$_2$·HX, COOR$_1$]

wherein
R is alkoxy of 1 to 4 carbon atoms,
$R_1$ is lower alkyl or aralkyl, and
X is halogen or an acyloxy, in which a compound of the formula (II)

$$R_1OOC-CH(COR_2)-CH_2-CH_2-CH_2-X \quad (II)$$

wherein $R_2$ is lower alkyl or alkoxy, is partially hydrolyzed, and reacted with diazotized aniline or with a diazotized aniline derivative of the formula (III)

$$H_2N-C_6H_4-R \quad (III)$$

and the thus-obtained phenylhydrazone derivative of the formula (IV)

$$R_1OOC-C(=N-NH-C_6H_4-R)-CH_2-CH_2-CH_2-X \quad (IV)$$

is heated at 40° to 180°C.

* * * * *